Patented Aug. 30, 1932

1,874,989

UNITED STATES PATENT OFFICE

MORTIMER T. HARVEY, OF EAST ORANGE, NEW JERSEY, ASSIGNOR TO THE HARVEL CORPORATION, OF NEWARK, NEW JERSEY, A CORPORATION OF NEW JERSEY

METHOD AND COMPOSITION FOR CONTROLLING MOISTURE

No Drawing.  Application filed May 9, 1930.  Serial No. 451,206.

My present invention relates to a method for moisture conditioning tobacco and other products to control the amount of moisture in it so that there is not too much or too little, and the invention also relates to products of the invention used for the purpose set forth; and the method and products of the invention are useful in the arts generally for controlling the amount of moisture in candies, foodstuffs, celluloid, rubber and so on. More particularly, the present invention relates to the use of salts which form water of crystallization and which have been dehydrated and then partly hydrated by the addition of water to the dry salt.

The present invention is an improvement on the invention of Foote and Smith in Patent No. 949,701, issued February 15, 1910. In that patent, a salt with water of crystallization was partly dehydrated by heating and used to balance moisture in tobacco and tobacco products held in a closed casing with said partly dehydrated salt, but I find that this material has a very slow control on the moisture both as to giving off moisture to and taking it up from the tobacco. I have discovered that sensitive control in both directions can be secured with bisodium phosphate, $Na_2HPO_4$, by taking this salt with water of crystallization thereon and completely dehydrating as by heating, care being taken that the pyro salt is not reached. The dehydrated salt is then placed in a closed container with tobacco to be moisture controlled, with water added to the salt. The water can be added before or after the salt is put into the container.

The dehydrated salt is preferably powdered after dehydration to increase its surface area, and the amount of water it can readily take up by absorption. The relation of the dehydrated salt to the water apparently results in a control on the rate of evaporation of the water held thereby; and this control is such that "spotting" of cigarettes does not occur even when the salt carries the maximum amount of water which it will hold by absorption. At the same time sufficient is given off to the tobacco to keep it moist to the extent required by smokers in the trade.

The salt in the completely dehydrated state probably can be best described as having some affinity for water without forming water of crystallization therewith to any appreciable extent as far as subsequently giving off and taking up of moisture to and from the atmosphere is concerned. Water can be added in excess of the amount that the dehydrated salt will take up and the excess poured off after a minute or so, or a less amount of water may be sufficient for particular cases.

The water and the dehydrated salt have a cementing action on each other, and I take advantage of this condition to make up cakes or blocks from the pulverized dehydrated salt; and I have further discovered that cakes and blocks so made are well suited for the purpose of the present invention because; (1) the cake or block controls the moisture condition even though its superficial area is apparently decreased from that of the pulverized salt before forming the cake or block, and (2) too much moisture is not given off even though the salt is laden with water to its capacity.

As an example of the preparation of a product of the invention the following is set forth. $Na_2HPO_4.12H_2O$ is heated between 200° and 300° F. to drive the water of crystallization therefrom to form $Na_2HPO_4$, with practically no water of crystallization. The salt in this condition is slightly hygroscopic when cooled salt is then pulverized. Water is then added to excess to a quantity of the material to be used in a particular tobacco and then excess poured off after three or four minutes. The water thus added combines in a cementing action with the salt and will last a long time without replenishing. Or, the pulverized salt, with the water added, is pressed into a cake, with any excess water poured or drained off either before or after the forming of the cake. This cake can then be sold and used as a unit ready for use, preferably with a cover or container around it to keep the water from evaporating before it is put into actual use. And water can be added to it from time to time when required.

For some purposes, where it is desired to make the moisture in a cake of the materials of the invention, more readily or quickly available, and also to prepare for a more rapid intake of moisture, I mix with the materials described above, a "diluting" or "opening" material such as sawdust, cork dust, sand, borax, talc, or $Na_2HPO_4.12H_2O$, in proportions, ranging from about 5% of the "diluting" material up to 60% or more.

A practical example is equal parts of $Na_2HPO_4.12H_2O$ and of $Na_2HPO_4$, with water added to cement these materials together and to supply moisture for humidifying. The water can be added before the two salts are mixed. Such cakes can be formed, in either case, before or after the water is added.

The materials of the invention are suitable for use in refrigerators for maintaining proper moisture conditions in foodstuffs generally including fruits and vegetables and, as above set forth, the materials of the invention are suitable generally for maintaining proper moisture conditions in food stuffs, including fruits and vegetables, in candies, in celluloid, and in rubber and other products, and in the claims where reference is made to conditioning of or a moisture conditioner for tobacco and the like it is intended that these other products hereinabove named are covered by the claims.

Having thus described my invention, what I claim as new and desire to protect by Letters Patent, is:—

1. A moisture conditioning unit for tobacco and the like comprising substantially completely dehydrated bisodium phosphate in a pulverized state with sufficient water therewith to bind the particles into a cake.

2. A moisture conditioning material for tobacco and the like which comprises bisodium phosphate which has been heated between 200° and 300° F. to substantially complete dehydration.

3. A moisture conditioning material for tobacco and the like comprising bisodium phosphate which has been heated between 200° and 300° F. to substantially complete dehydration, pulverized, and has water mixed therewith.

4. In the preparation of salt having water of crystallization for use as a moisture conditioner for tobacco and the like, the step which consists in substantially dehydrating said salt, mixing hydrated bisodium phosphate therewith, and adding water thereto.

5. In the preparation of salt having water of crystallization for use as a moisture conditioner for tobacco and the like, the step which consists in substantially dehydrating said salt, mixing another product therewith, and adding water thereto.

6. A moisture conditioning unit for tobacco and the like comprising a mixture of substantially completely dehydrated bisodium phosphate and hydrated bisodium phosphate, in a pulverized state with sufficient water therewith to bind the particles together.

7. A moisture conditioning unit for tobacco and the like comprising a mixture of substantially completely dehydrated bisodium phosphate and hydrated bisodium phosphate, in relative amounts ranging from about ten parts by weight of the completely dehydrated bisodium phosphate to one part of the hydrated bisodium phosphate to about one part by weight of the completely dehydrated bisodium phosphate to four parts of the hydrated bisodium phosphate, in a pulverized state with sufficient water therewith to bind the particles together.

Signed at Irvington in the county of Essex and State of New Jersey this 28th day of April A. D. 1930.

MORTIMER T. HARVEY.